United States Patent
Maia

(10) Patent No.: US 6,370,641 B1
(45) Date of Patent: Apr. 9, 2002

(54) METHOD AND APPARATUS FOR DETERMINING THE DRIVE LETTER ASSIGNMENT OF A CD-ROM DRIVE DURING INITIAL SYSTEM SETUP OF A COMPUTER SYSTEM

(75) Inventor: Paul J. Maia, Cedar Park, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/237,644

(22) Filed: Jan. 26, 1999

(51) Int. Cl.⁷ ............................................. G06F 15/177
(52) U.S. Cl. ......................................... 713/1; 713/100
(58) Field of Search ................................. 713/1, 2, 100

(56) References Cited

U.S. PATENT DOCUMENTS

| | | |
|---|---|---|
| 5,630,076 A | 5/1997 | Saulpaugh et al. |
| 5,696,968 A | 12/1997 | Merkin |
| 5,721,952 A | 2/1998 | Lin et al. |
| 5,815,705 A * | 9/1998 | Slivka et al. ............... 713/2 |
| 5,896,546 A * | 4/1999 | Monahan et al. ........... 710/10 |
| 5,963,743 A * | 10/1999 | Amberg et al. ............ 395/712 |
| 5,991,543 A * | 11/1999 | Amberg et al. ............ 395/712 |
| 5,995,757 A * | 11/1999 | Amberg et al. ............ 395/712 |
| 6,016,402 A * | 1/2000 | Thomas et al. ............ 395/828 |
| 6,119,131 A * | 9/2000 | Cabrera et al. ............ 707/203 |
| 6,134,616 A * | 10/2000 | Beatty ....................... 710/104 |
| 6,182,275 B1 * | 1/2001 | Beelitz et al. ................ 717/1 |

* cited by examiner

*Primary Examiner*—Dennis M. Butler
(74) *Attorney, Agent, or Firm*—Haynes and Boone, LLP

(57) ABSTRACT

A computer system includes a processor, at least one computer-readable media drive, and manufacturing process code. The manufacturing process code includes executable instructions for causing the processor to determine a drive letter designation of the at least one computer-readable media drive. The computer system further includes an operating system and a system descriptor record, wherein the operating system includes a desktop suitable for implementation of shortcuts and menu selections to computer-readable media drive based software applications. The drive letter designation of the computer-readable media drive is further a function of the operating system and the system descriptor record. Still further, the manufacturing process code enables a determination of the computer-readable media drive letter designation by the processor to be operable prior to the operating system desktop becoming fully initialized, further for enabling a binding of computer-readable media drive based software applications in an establishing of the shortcuts and menu selections on the desktop.

24 Claims, 3 Drawing Sheets

*RETURNS THE DRIVE LETTER OF THE CDROM DRIVE OR A ZERO IF THE CDROM WAS NOT FOUND OR EXPECTED.
*IF THE CALLER PASSES A POINTER TO AN INTEGER, THIS FUNCTION WILL SET THE VALUE TO A 0 IF THE OPERATING SYSTEM ASSIGNED THE DRIVE LETTER FOR THE CDROM AND A 1 IF THE DRIVE LETTER WAS ASSIGNED BY THE DLL FUNCTIONALITY.

METHOD AND APPARATUS FOR DETERMINING THE DRIVE LETTER ASSIGNMENT OF A CD-ROM DRIVE DURING INITIAL SYSTEM SETUP OF A COMPUTER SYSTEM

BACKGROUND

The disclosures herein relate generally to computer systems, and more particularly, to a method and apparatus for determining the drive letter assignment of CD-ROM drive during initial setup of a computer system.

This application relates to co-pending U.S. patent application Ser. No. 08/919,959, filed on Aug. 29, 1997, entitled "Software Installation And Testing For A Built-to-Order Computer System", naming Richard D. Aniberg, Roger W. Wong and Michael A. Brundridge as inventors. The co-pending application is incorporated herein by reference in its entirety, and is assigned to the assignee of the present invention.

This application relates to co-pending U.S. patent application Ser. No. 08/920,773, filed on Aug. 29, 1997, entitled "Software Installation And Testing For A Built-to-Order Computer System", naming Richard D. Amberg, Roger W. Wong and Michael A. Brundridge as inventors. The co-pending application is incorporated herein by reference in its entirety, and is assigned to the assignee of the present invention.

This application relates to co-pending U.S. patent application Ser. No. 08/921,438, filed on Aug. 29, 1997, entitled "Database For Facilitating Software Installation And Testing For A Built-To-Order", naming Richard D. Amberg, Roger W. Wong and Michael A. Brundridge as inventors. The co-pending application is incorporated herein by reference in its entirety, and is assigned to the assignee of the present invention.

During an initial start and setup of a computer system by a customer, including an initialization and setup of the operating system (e.g., Windows95™, Windows98™, etc.), the drive letter of the CD-ROM is not known to the operating system (O/S). If there are additional devices installed in the computer system, such as a removable cartridge hard disk drive or ZIP™ drive, the drive letter of the CD-ROM will change, i.e., be different from that of a computer system not having a removable cartridge hard disk drive. A problem results in a built-to-order computer manufacturing process with respect to the computer manufacturing applications which implement a factory download of software to a target computer system being built. The manufacturing applications need the drive letter of the CD-ROM drive to do binding of CD based applications to shortcuts and menu selections. Without correct binding, the computer system will fail to operate in a desired manner.

One prior method for determining the drive letter of a CD-ROM drive included finding all hard drive letters in a given computer system and then guessing that the CD-ROM drive letter would be next in a row of hard drive letters. This particular method determining of the assignment of drive letters is broken (i.e., fails) if a removable cartridge hard disk drive is added to the target computer system.

Another method includes the use of a DOS driver to assign a drive letter to the removable cartridge hard disk drive during a customer's initial boot up of the computer system. In such an instance, during a system setup, the CD-ROM drive letter would be assigned correctly. However, this particular method is problematic in that the driver is supplied by an outside vendor, furthermore, wherein the driver is highly likely to cause severe disk corruption on disk drives larger than 8.4 gigabytes. In addition, this method fails to work under WindowsNT™ and Windows98™ operating system environments.

Yet another method would be to hard code the CD-ROM drive letter, to be well beyond any drive letters that would normally be used by other devices. Such a method however is not a preferred way because network drive connections may need to use the drive letter that is hard coded.

In a custom built-to-order manufacturing environment, the computer systems being built always have the potential to be different from each other. The computer systems can differ in hardware and software according to a particular customer order. For example, software applications can be installed on custom built-to-order computer systems during manufacturing. The applications are typically installed from CD-ROM. The software applications may also need access to a CD-ROM once a customer gets his/her machine. For operability, the applications need to know what the drive letter of the CD-ROM is.

In prior computer system manufacturing, a CD-ROM drive letter was decided upon and then stored until needed. In the custom built-to-order environment, a problem occurs when the list of peripherals in a given computer system and the list of peripherals that an operating system of the computer system recognizes is different. For instance, a removable cartridge hard drive may be installed in the computer system, however the operating system does not recognize it. At the time of installing software applications in the custom built-to-order manufacturing environment, if the operating system (O/S) were queried whether or not a CD-ROM drive is on the system, the O/S would respond that a CD-ROM is not present. This is because at that point in the manufacturing process the O/S doesn't know about any CD-ROM yet. In other words, it is not there, however, it can be assumed what the drive letter for a CD-ROM drive is. The assumption can be made according to a method of counting the hard disk drive, the number of drive letters, and adding one. The resultant number count is then correlated with the alphabet, wherein the corresponding letter is assumed to be the CD-ROM drive letter. As computer systems have begun being built with multiple CD-ROM drives, multiple removable cartridge hard disk drives, and the like, the assumption of counting up to the last hard drive and adding one no longer results in the appropriate CD-ROM drive letter.

One possible way to remedy the above problem could include modifying every software application being loaded onto the custom built-to-order system for figuring out what the CD-ROM drive letter of the computer system is. Such a modification would be required from each application vender. Alternatively, the CD-ROM drive letter could be fixed at a given drive letter designation and made unchangeable. Such remedies are not suitable for high volume custom built-to-order computer manufacturing.

It would thus be desirable to provide an improved method and apparatus for the determination of the drive letter assignment of a CD-ROM drive, especially for use during a custom built-to-order computer system manufacturing process.

SUMMARY

According to one embodiment, a computer system includes at least one processor, at least one computer-readable media drive, and manufacturing process code. The manufacturing process code includes executable instructions for causing the processor to determine a drive letter designation of the at least one computer-readable media drive. The computer system further includes an operating system and a system descriptor record, wherein the operating system includes a desktop suitable for implementation of shortcuts and menu selections to computer-readable media drive based software applications. The drive letter designation of the computer-readable media drive is further a function of the operating system and the system descriptor record. Still further, the manufacturing process code enables a determination of the computer-readable media drive letter designation by the processor to be operable prior to the operating system desktop becoming fully initialized, further for enabling a binding of computer-readable media drive based software applications in an establishing of the shortcuts and menu selections on the desktop.

The embodiments of the present disclosure advantageously provide a dynamic link library functionality for determining drive letter designations based on the operating system, the installed components, and how those components are installed in the target computer system.

The embodiments of the present disclosure further advantageously provide for determining of computer-readable media drive letter designations during a target computer system setup by building an expected drive type list which includes the drive type list as it will be when the target computer's operating system desktop is fully initialized.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DETAILED DESCRIPTION

Figure 1:
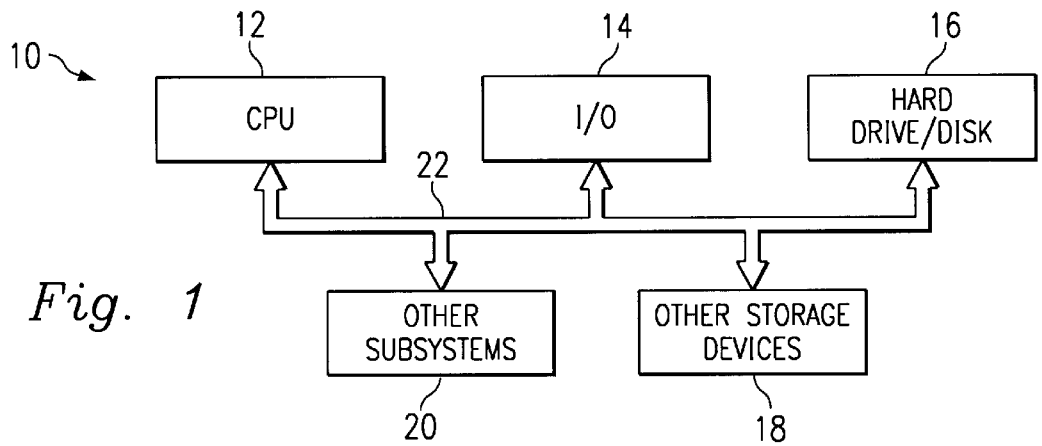
FIG. 1 illustrates a block diagram of a computer for implementing one embodiment of the present disclosure.

Referring briefly to FIG. 1, a system block diagram of a computer system 10 is shown having features thereof configured in accordance a customer configured computer system order as discussed herein. The computer system 10 includes a central processing unit (CPU) 12, input/output (I/O) devices, such as a display, a keyboard, a mouse, and associated controllers, collectively designated by a reference numeral 14, a hard disk drive 16, and other storage devices, which may include a floppy disk drive, CD-ROM drive, and the like, collectively designated by a reference numeral 18, and various other subsystems, such as a network interface card (or NIC), collectively designated by a reference numeral 20, all interconnected via one or more buses, shown collectively in FIG. 1 as a bus 22.

When installing a software application on a custom built-to-order computer system and the software application needs to know what the CD-ROM drive letter is, according to the present embodiments, a central core piece of manufacturing code is provided. The manufacturing code looks at the operating system, looks at the customer order, looks at how the computer system is set up, looks at how the hard drive is formatted, looks to see what kind of hardware is present in the computer system and then makes an educated decision according to a prescribed method as to what the CD-ROM drive letter will be. The CD-ROM drive letter determination will be the same as that assigned by the O/S when the customer finally gets his/her computer system and boots-up for the first time. At the time the software applications are being installed during the built-to-order manufacturing process, certain information is not yet known about the computer system. This is because it is unknown actually how the operating system of the computer is going to assign drive letters in the computer system. For example, Windows NT™ operating system assigns drive letters differently than Windows 95 operating system.

A central core piece of manufacturing code is made part of a software application installer that runs inside of an operating system set up phase during a manufacturing process. When the computer system is first brought up for a customer, in the operating system set up phase that the core piece of software is running inside of, when nothing is known about the drive letter assignments, there is provided a prescribed CD-ROM drive letter designation central application (referred to herein as OS Drive) which goes out and builds a table of where everything is, and from that point on, it is known where everything is going to be. Thereafter, when an application needs to know where a CD-ROM drive is, it will know. Furthermore, if it is needed to know what the removable cartridge hard drive letter is, it will be known. With that embodiments of the present disclosure, the drive letter information for any given computer system can be readily provided. The present embodiments thus include a software tool.

A computer system is broken or rendered non-functional when an application running thereon cannot find the computer system's CD-ROM drive if needed. A CD-ROM drive may be required for a customer to re-install and/or run an application. In some cases, if the CD-ROM drive is not found, an application may be functional, however, not 100% functional. A word processing application might need access to a CD-ROM drive but not be able to find it, for example, to load a documentation set. In such an instance, the word processing application can run, however the documentation set would not be available on-line. A system user would have to use printed manuals. This illustrates some of the types of problems that can be encountered.

The present embodiments use a combination of a built-to-order manufacturing application and a system descriptor record (SDR). The built-to-order manufacturing application includes custom ordered computer systems. The system description record includes a record or data file containing information on which particular components are installed or to be installed on a customer built-to-order computer system.

Autotool is an application in the built-to-order computer system manufacturing environment that uses the software tool embodiments of the present disclosure. The software tool of the present disclosure uses the SDR which provides prescribed information and, further which provides information to the Autotool application. The Autotool application is used in conjunction with software installation aspects in the manufacture of a custom built-to-order computer system. That is, Autotool builds a software set for a given customer built-to-order computer system according to a particular custom computer system order.

If a customer order includes the installation of a CD-ROM drive, then as part of the manufacturing process, the present embodiments will be utilized. The manufacturing process for built-to-order computer systems includes a software installation by a software installer. The software which is needed to be installed in a custom built-to-order computer system could potentially be different for each custom built-to-order computer system being manufactured. For built-to-order computer systems being manufactured with a CD-ROM drive, the present embodiments are used to ensure a correct determination of the CD-ROM drive designation.

In the built-to-order manufacturing process, ReadyWare is a term used to refer to commercially available software applications (e.g., word processor, database, spreadsheet software applications) which are installed onto a built-to-order computer system manufactured according to aparticular customer order. During the manufacture of a custom built-to-order computer system, the ReadyWare software applications are loaded onto the computer system. The software applications are installed as a post-installed component. The software installation of the manufacturing process is fully automatic, i.e., without the use of a system operator physically activating any switches or keystrokes for inserting a CD-ROM drive letter designation during a software installation. In a high volume custom built-to-order manufacturing environment of many thousands of systems per day, manual or physical intervention during a software installation is counter productive and highly cost prohibitive, and thus not preferred.

During the custom built-to-order manufacture process, software applications are loaded onto a given computer system. Autotool takes a big picture (i.e., captures an image) of what a particular software application is to a computer system, and then stores that information for later usage. The captured image information of the software application is put onto each computer system being built. When the Autotool captured the picture of the software application, the CD-ROM drive letter might have been "L", but on a particular computer system being manufactured, the CD-ROM drive letter may not be "L". A computer system being manufactured may not even have a CD-ROM drive. For instance, a customer might purchase Microsoft Office, but not have ordered a CD-ROM drive. The present embodiment would determine what the CD-ROM drive letter would be if a CD-ROM drive were added to the custom built-to-order computer system. A customer can add a CD-ROM drive to the computer system at a later time, and with the use of the present embodiments, the correct CD-ROM drive designation is readily determined.

The custom built-to-order computer systems being built are unique and the ReadyWare software applications are unique per built-to-order computer system. The present embodiments assist in making the hardware and software work together in a desired functional manner.

As hardware, software, device drivers, and the like are added to built-to-order computer systems, the CD-ROM drive letter designation commonly moves around (i.e., can vary) during an installation of software on a given computer system. The CD-ROM drive letter designation is not a stable target. A software installation scenario may include beginning with no CD-ROM, a CD-ROM with an incorrect drive letter designation, to a CD-ROM that eventually and finally is at the correct drive letter. Unfortunately, when the ReadyWare applications are being installed, the operating system of the target computer system is in any one of various stages throughout the software installation. The software installation process cannot depend upon what the operating system's knowledge is of what things are and how they are set up within the target computer system. Actually, the process of the present embodiments goes out and looks at what the operating system (O/S) is, looks at the components of the customer order (i.e., what is supposed to be in the computer system), and determines whether or not there is a CD-ROM drive letter and if not, then what would it be. The present embodiment does this with respect to the ReadyWare software applications.

Further with respect to the built-to-order manufacturing process, FISH is an acronym for factory installed software for hardware. FISH essentially includes the software device drivers for the hardware installed on a given target computer system. If a CD-ROM drive were ordered as part of a custom built-to-order computer system, then device drivers for that CD-ROM drive are installed onto the computer system during the built-to-order manufacturing process. With ReadyWare software applications, there are generally no circuit boards or hardware associated with the ReadyWare software applications. With FISH, there is always hardware associated with the device drivers. The ReadyWare software applications, in many cases, need to know what is eventually going to happen as a by-product of the device drivers being installed, i.e., the CD-ROM drive letter or removable cartridge hard disk drive device driver and drive letter designations, for instance. In many cases with respect to the installation of ReadyWare software applications, the particular device drivers are not yet loaded into the computer system at this point in the manufacturing process, i.e., the device drivers are not physically there yet. The present embodiments discern the drive letter designations based upon information which is currently known about the computer system, further as discussed herein.

During the software installation process, whatever an operating system says a CD-ROM drive designation is, the present embodiments make use of that CD-ROM designation. As a by-product, the present embodiments determine what the drive letter designation is and where the drive letter designation is eventually going to be. If the computer system has a CD-ROM drive letter designation of "E" and also has a removable cartridge hard drive, the removable cartridge hard drive letter designation gets inserted before the CD-ROM drive designation and the CD-ROM drive designation gets bumped up to a next drive letter designation. In this example, the removable cartridge hard disk drive becomes the E: drive and the CD-ROM drive becomes the F: drive. All of the installed software applications that know about the CD-ROM drive on the E: drive will no longer work since the letter designation E: is now pointing to the removable cartridge hard drive, whereby installed software applications can no longer find the CD-ROM drive there. The present embodiments overcome this situation.

Upon installation of the ReadyWare software applications, the applications attach themselves to a drive letter. The drive letter is provided by the present embodiments, i.e., the method of the present embodiment informs the software applications what the CD-ROM drive letter is, since the actual drive letter is not really real at this point in the manufacturing process. Upon the addition of a removable cartridge hard drive, the CD-ROM drive designation is altered or changes, for example as discussed herein above.

The present embodiments provide a method for determining where the CD-ROM drive designation is ultimately going to be. FIGS. 2-5 illustrate flowcharts of exemplary source code of a dynamic link library (DLL) for use in determining a CD-ROM drive letter designation according to the present embodiments to be discussed further herein below. The flowcharts illustrate the functional flow of the software embodiments in a dynamic link library form. DLL form allows for easy replacement of a module, without having to re-compile the entire factory process. For instance, if a particular computer system included two CD-ROM drives, then the DLL can be modified to handle the inclusion of two CD-ROM drives and still consistently know where the CD-ROM drive letter is going to be.

The present embodiments are active inside a target computer system. During an installation of manufacturing software onto a target computer system, the CD-ROM drive letter designation embodiments (referred to herein as OS Drive) of the present disclosure is loaded onto the target system for use during the period of a ReadyWare and FISH software installation process. The CD-ROM drive letter designation embodiments can be removed from the target system upon completion of its intended use.

Computer system software installation can occur both at the factory and at the customer site. In some cases, certain software can be installed at the factory and in other cases the software is not, depending on the operating system of the target computer system. During an initial customer system start up, OS Drive of the present disclosure gets run. Note that during a computer system manufacturing process, there are two phases to software installation. A first phase of software installation is in terms of software download. Software download includes downloading of customer ordered ReadyWare software applications at the factory onto computer system. OS Drive is included within the software downloaded onto the computer system. The computer system may or may not be shipped to the customer at this point in the manufacturing process. When the computer system is first powered up or started, an installation of the software which was downloaded occurs. In other words, the second phase of software installation is the actual installation of the downloaded software. The initial start and operating system set-up may or may not be part of the in-factory manufacturing process. Initial operating system set-up could include downloading of O/S software as it was received directly from the manufacturer of the O/S software. It is during the installation of the downloaded software that the problem of incorrect CD-ROM drive letter designation becomes apparent. The downloaded software will not function as intended in the case where a CD-ROM drive letter designation is incorrect, i.e., not at a particular designation.

Subsequent to a download of software and an install of all the downloaded software, the customer may then want to run some of that software. When downloading the software onto the computer system, it is not necessary to know where the CD-ROM drive is (i.e., what the drive letter designation is). When installing the downloaded software, while not requiring a communication with the CD-ROM drive, it is necessary to know where the CD-ROM drive is going to be (i.e., what the drive letter is going to be) when the customer desires to run the software. At the time that the software applications are being installed, the CD-ROM drive letter is not known. The present embodiments however are active during the software installation to determine what the CD-ROM drive letter designation will be when a customer subsequently uses the software. That is, software applications, while not requiring communication with the CD-ROM drive during installation, may require communicating with the CD-ROM drive during usage. At this point in the process, the CD-ROM drive gets assigned its drive letter designation via OS Drive. The CD-ROM drive letter designation could be reassigned at some point between an install software point in time and a run software point in time. Finalization of drive letter designations occurs some time after the software is installed but before the software is run by a customer. The operating system installed on the computer system performs the finalization of drive letter assignments, according to a particular algorithm of the operating system. For example, with a Microsoft OS, drive letter assignments for diskette drives include A: and B:. Drive letter designations C: and onward are for however many hard disk drives there are in the computer system. Next, drive letter designations are assigned for removable hard disk drives. Next, drive letter designations are assigned for any CD-ROM drives. A computer system may include more than one CD-ROM drive.

During the install software phase of the manufacturing process, the number of diskette and hard disk drives and their drive letter designations is known. This is because the operating system has already assigned those drive letter designations. The removable hard disk drives and CD-ROM drive letter designations however are not known during the install software phase. With a knowledge of how the operating system will eventually assign the drive letter designations of removable hard disk drives and CD-ROM drives, in combination with the customer order, and further in connection with what the O/S does know about the computer system, a mechanism is provided to pre-assign the removable cartridge hard disk drive and CD-ROM drive letter designations, after gaining a knowledge of what the drive letter designations are eventually going to be. During customer usage of a computer system, the software which is being run must actually know what a particular removable hard disk and/or CD-ROM drive letter designation is in order for the software to operate as intended. The present embodiments provide the drive letter designations of the removable hard disk drives and CD-ROM drives during software installation. The computer system will thus function as desired when the software is run.

To further illustrate, lets say the O/S is downloaded onto the computer system and a customer is given a box of CD-ROM disks. For each software application, the customer would be required to insert each CD into the drive, click on "install", and then wait for the respective install program to run. This would be needed for each software application, up to the total number of software applications ordered with a particular computer system to install all of the software applications necessary to make the computer system what it eventually should have been from the factory. Once at the customer's desktop, (e.g. Window's desktop) all drive information is known. From the standpoint of a time line in the manufacturing process, first there is the download, then the computer system is powered up for a first boot of the system. As the computer system is running, doing its work, the software applications are installed. The computer system may be rebooted one or more additional times during the manufacturing process. Eventually, the computer system will be at the Windows Desktop (i.e., where Microsoft Windows is the operating system). When the computer system is at the Windows desktop, all drive letter designations are known. For a generic computer system, all software applications can be pre-installed onto the computer system in a single configuration, then the drive designations will always be known since there is only one configuration. With a generic computer system, a customer wanting two 8-Gbyte hard disk drives would not be able to obtain the same if the generic computer system software image only allowed for one hard disk drive. In the custom built-to-order manufacturing process, the installing of software applications occurs early enough in the operating system's set up to where the operating system does not know about CD-ROM drives, removable cartridge hard disk drives, and potentially other things, e.g., RAM cards. The present embodiment OS Drive, at the point in time of the software installation, figures out what the drive designations will be at the Windows desktop. The information obtained (and/or determined) by OS Drive is used during installation of the software applications so that when the applications are installed, the drive designations bound to the software applications will be the same as those when the computer system is at the O/S desktop.

In other words, OS Drive makes a determination as to what the future condition of the Windows desktop will be based upon the customer order information, the number of diskette drives and hard disk drives installed in the computer system at that point in time, and the number of partitions on the hard disk drive. All of these are inputs to determining a future condition of eventually what the operating system is going to have when the desktop is first fully operational.

The present embodiment provides an improved manufacturing process for custom built-to-order computer systems. OS Drive works in conjunction with software installation of the built-to-order manufacturing process. OS Drive is in the form of a DLL and provides for CD-ROM drive letter determination of a target computer system. OS Drive includes a Get CDROM Drive Letter, Get Fake CDROM Drive Letter, Get Expected Drive Type Lists and Get Drive Type modules, explained further herein below.

The present embodiment advantageously reduce a need for technical support from the computer manufacturer with respect to indeterminate drive letter assignments. A high percentage of customers may be purchasing a computer system for the first time and thus know little about drive designations and drive letter assignments.

Get CDROM Drive Letter is an overview of the process for determination of a drive letter designation according to an embodiment of the present disclosure. Get CDROM Drive Letter is a functional interface for the DLL. Calling the function Get CDROM Drive Letter will return with the CDROM drive letter designation that the CD-ROM drive will be at the point in time of reaching the Windows desktop (in the instance of Microsoft Windows operating system) or other OS desktop.

Get Fake CDROM Drive Letter is a module of the Get CDROM Drive Letter functional interface for the DLL. Recall that some computer systems may not include a CD-ROM drive. Get Fake CDROM Drive Letter determines what the actual CD-ROM drive letter will be if the manufacturer (customer) were to install one.

Get Expected Drive Type Lists is a module that uses a combination of the customer order, currently installed components of the computer system, yet to be installed components of the computer system, how the OS has enumerated things that it knows about so far in the computer system, and then makes a determination as to what all of the drive letter assignments are going to be. Get Expected Drive Type Lists builds a table including removable cartridge hard disk drives, diskette drives, hard disk drives, CD-ROM drives, etc. The table is temporarily stored in memory of the computer system. Once the table is used for this functionality and the DLL exits, the table is gone. The purpose of the table is that subsequent calls to the Get Expected Drive Type Lists to get a CD-ROM letter does not require recalculating the drive letter designation each time the module is called. Once the table is built, its usage provides a performance advantage.

Get Drive Type allows using the table built using Get Expected Drive Type Lists for an external application to call and find out what each element of the table is. For instance, if an application requires knowing what the CD-ROM drive designation letter is, then the Get Drive Type module can be used. If the application requires knowing what the removable cartridge hard disk drive designation letter is, then Get Drive Type module can be used.

Figure 2:
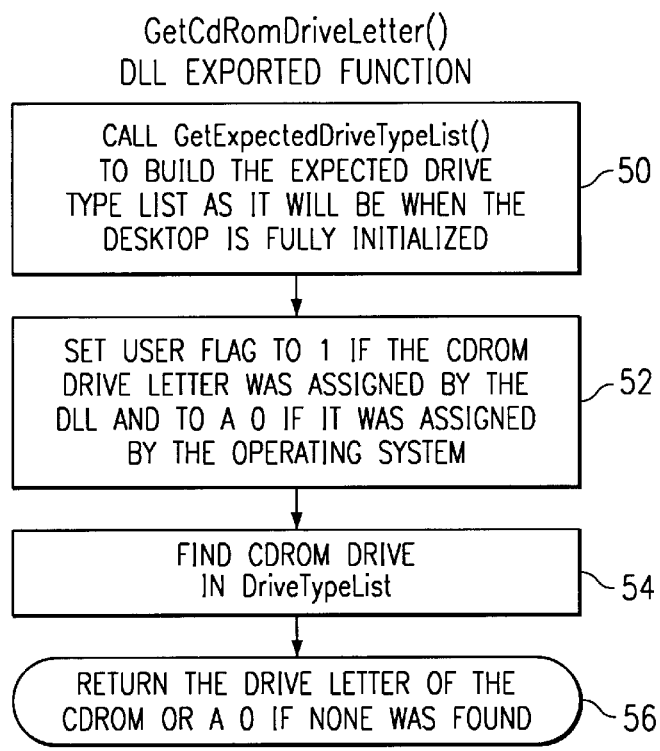
FIG. 2 illustrates a source code flow diagram for a Get CDROM Drive Letter module according to the embodiments of the present disclosure.

With reference now to FIG. 2, the GetCdRomDriveLetter( ) DLL exported function shall be discussed in further detail. The GetCdRomDriveLetter( ) DLL exported function returns i) a drive letter designation of the CD-ROM drive or ii) a zero (0) if the CDROM drive was not found or expected. If the calling routine passes a pointer to an integer, the GetCdRomDriveLetter( ) DLL exported function will set the value to i) a zero (0) if the operating system assigned the drive letter for the CDROM drive and ii) a one (1) if the drive letter was assigned by the DLL functionality. In step 50, the GetExpectedDriveTypeList( ) DLL internal function is called to build an expected drive type list as it will be when the target computer's operating system desktop is fully initialized. In step 52, a user flag is set to one (1) if the CDROM drive letter was assigned by the DLL and to a zero (0) if the drive letter was assigned by the operating system. In step 54, the function uses the DriveTypeList to try and find the CDROM drive. In step 56, the GetCdRomDriveLetter( ) DLL exported function returns i) the drive letter of the CDROM drive or ii) a zero (0) if no CDROM drive was found.

Figure 3:
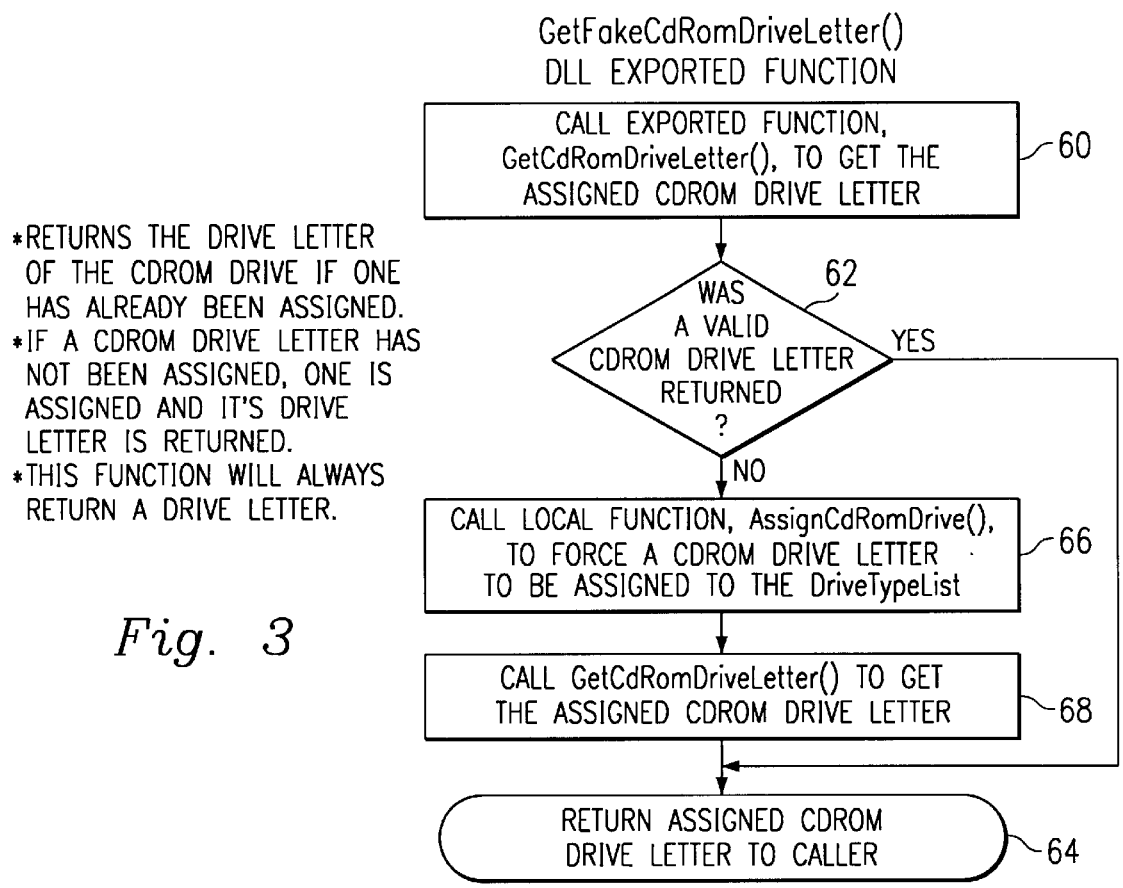
FIG. 3 illustrates a source code flow diagram for a Get Fake CDROM Drive Letter module according to the embodiments of the present disclosure.

Turning now to FIG. 3, the GetFakeCdRomDriveLetter( ) DLL exported function shall be discussed in further detail. The GetFakeCdRomDriveLetter( ) DLL exported function returns i) the drive letter of the CDROM if one has already been assigned and ii) if a CDROM drive letter has not been assigned, one is assigned and the corresponding drive letter is returned. In addition, the GetFakeCdRomDriveLetter( ) DLL exported function always returns a CDROM drive letter. In step 60, the GetCdRomDriveLetter( ) DLL exported function is called to obtain the assigned CDROM drive letter. In step 62, an inquiry is made as to whether or not a valid CDROM drive letter is returned. If a valid CDROM drive letter was returned, then the process continues with step 64. In step 64, the GetFakeCdRomDriveLetter( ) DLL exported function returns the assigned CDROM drive to the caller. If in step 62, an invalid CDROM drive letter was returned, then the process continues with step 66. In step 66, a local function AssignCdRomDrive( ) is called to force a CDROM drive letter to be assigned to the DriveTypeList. The process then proceeds to step 68. In step 68, the GetCdRomDriveLetter( ) DLL exported function is called to obtain the assigned CDROM drive letter. The process then proceeds to step 64, wherein the GetFakeCdRomDriveLetter( ) DLL exported function returns the assigned CDROM drive to the caller.

Figure 4:
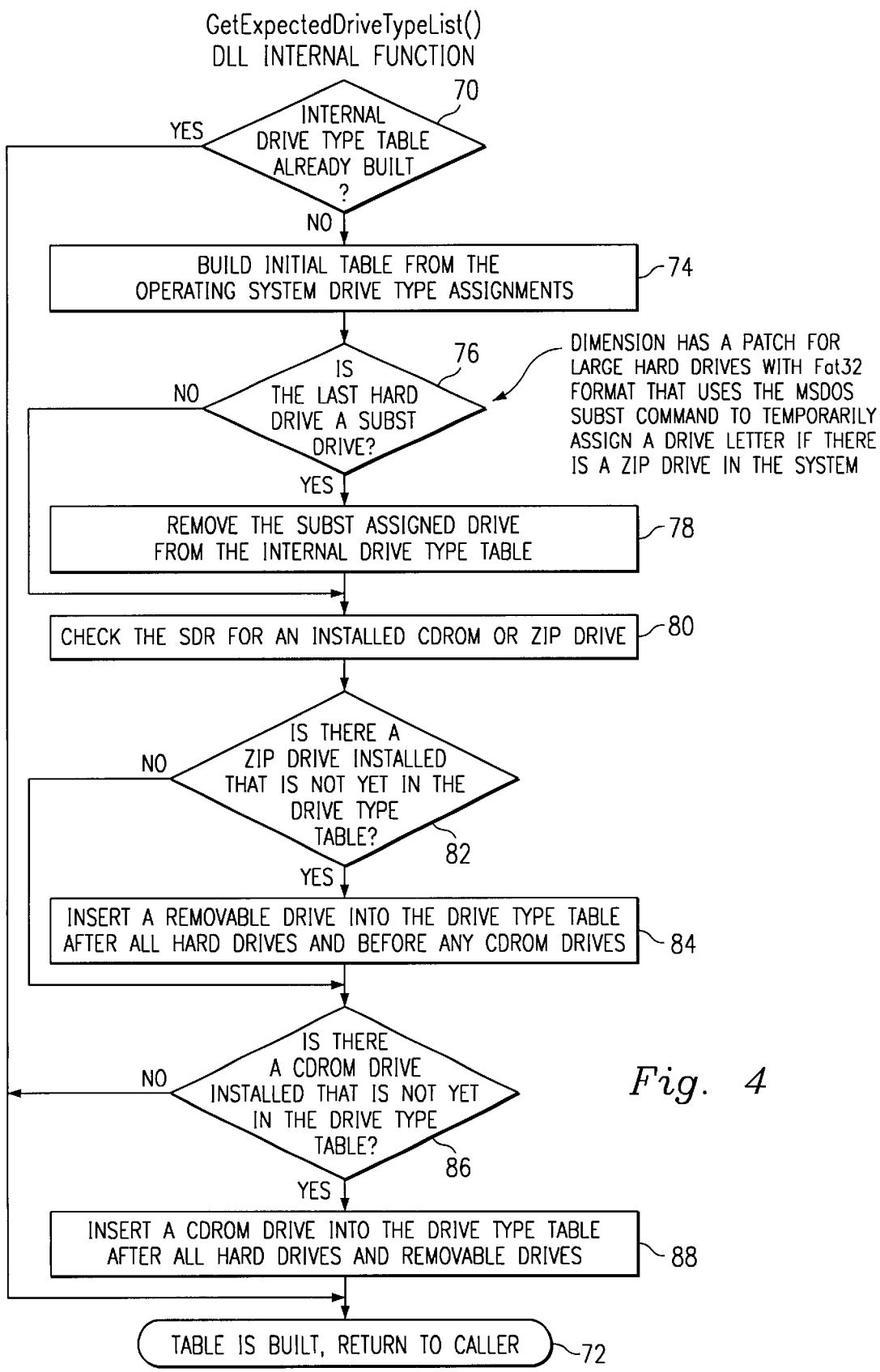
FIG. 4 illustrates a source code flow diagram for a Get Expected Drive Type List module according to the embodiments of the present disclosure.

With reference now to FIG. 4, the GetExpectedDriveTypeList( ) DLL internal function shall be discussed in further detail. Beginning with step 70, an inquiry is made as to whether or not an internal drive type table has already been built. If the table has already been built, then the process proceeds to step 72 for returning to the caller. If in step 70, the internal drive type table had not already been built, then the process proceeds to step 74. In step 74, the internal drive type table is built from the operating system drive type assignments. In step 76, an inquiry is made as to whether or not the last hard drive is a SUBST (substitute) drive. For instance, in certain computer systems, a patch for large hard drives with Fat32 format may make use of the Microsoft DOS SUBST command to temporarily assign a drive letter if there is a removable cartridge hard disk drive in the computer system. If the last hard drive is a SUBST drive, then the process advances to step 78. In step 78, the SUBST assigned drive is removed from the internal drive type table and the process continues with step 80. In step 76, if the last hard drive is not a SUBST drive, then the process proceeds with step 80. In step 80, the system descriptor record (SDR) is checked for an installed CDROM or removable cartridge hard disk drive (e.g., Zip drive). In step 82, an inquiry is made as to whether or not a removable cartridge hard disk drive is installed in the computer system that is not yet in the drive type table. If a removable cartridge hard disk drive is installed and not yet in the drive type table, then the process proceeds to step 84. In step 84, a removable cartridge hard disk drive is inserted into the drive type table after all hard drives and before any CDROM drives. The process then continues with step 86. If in step 82, no removable cartridge hard disk drive was installed in the system that was not yet in the drive type table, then the process proceeds with step 86. Step 86 provides an inquiry as to whether or not there is a CDROM drive installed in the computer system that is not yet in the drive type table. If a CDROM drive is installed and not yet in the drive type table, then the process proceeds to step 88. In step 88, a CDROM drive is inserted into the drive type table after all hard drives and removable cartridge hard disk drives. The process then continues with step 72. If in step 86, no CDROM drive was installed in the system that was not yet in the drive type table, then the process proceeds with step 72. In step 72, the table is thus built and the function returns to the caller.

Figure 5:
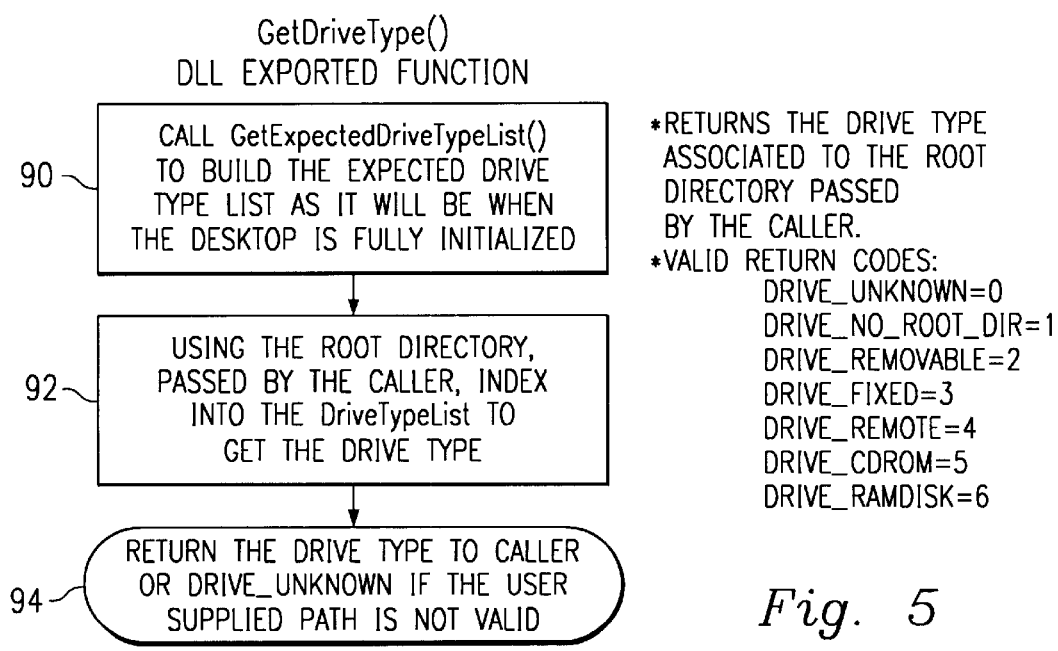
FIG. 5 illustrates a source code flow diagram for a Get Drive Type module according to the embodiments of the present disclosure.

Turning now to FIG. 5, the GetDriveType( ) DLL exported function shall be discussed in further detail. The GetDriveType( ) DLL exported function returns the drive type associated to the root directory passed by the caller. Valid return codes can include: DRIVE_UNKNOWN=0; DRIVE_NO_ROOT_DIR=1; DRIVE_REMOVABLE= 2; DRIVE_FIXED=3; DRIVE_REMOTE=4; DRIVE_ CD-ROM=5; AND DRIVE_RAMDISK=6. Other return codes may also be included as necessary for a particular implementation. In step 90, the GetExpectedDriveTypeList( ) DLL internal function is called to build the expected drive type list as it will be when the target computer's operating system desktop is fully initialized. In a next step 92, using the root directory passed by the caller, index into the DriveTypeList to get the drive type. Subsequent to obtaining the drive type, the process returns the drive type to the caller or a DRIVE_UNKNOWN return code if the user supplied path is not valid (step 94).

Autotool manufacturing software code is downloaded onto the computer system and is used for installing software applications. The manufacturing code includes instructions for installing those software applications which have been downloaded onto the computer system. The manufacturing code and the OS Drive code are downloaded onto the hard disk drive of the custom built-to-order computer system prior to an initial bootup of the computer system. Get Drive Type allows Autotool (or any external application that is using OS Drive) to gain access to the table which is built by the Get Expected Drive Type Lists.

The present embodiments advantageously include a DLL which encapsulates the functionality of determining the CD-ROM drive letter based on the operating system, the installed components, and furthermore, on how those components are installed in the respective target computer system. The computer system manufacturing application calls this DLL during system setup to get the drive letter of the CD-ROM. The DLL operates to obtain a list of the assigned devices in the particular target computer system.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims.

What is claimed is:

1. A computer system comprising:
   at least one processor;
   at least one computer-readable media drive;
   manufacturing process code including executable instructions for causing said at least one processor to determine a drive letter designation of said at least one computer-readable media drive;
   an operating system, said operating system including a desktop suitable for implementation of shortcuts and menu selections to computer-readable media drive based software applications; and
   a system descriptor record, wherein the drive letter designation of said computer-readable media drive is a function of said operating system and said system descriptor record.

2. The computer system of claim 1, wherein said manufacturing process code further enables a determination of the computer-readable media drive letter designation by said at least one processor to be operable prior to said operating system desktop becoming fully initialized, further for enabling a binding of computer-readable media drive based software applications in an establishing of the shortcuts and menu selections on the desktop.

3. The computer system of claim 1, wherein said computer-readable media drive includes a CD-ROM drive.

4. The computer system of claim 1, wherein said computer-readable media drive includes a removable cartridge hard disk drive.

5. The computer system of claim 1, wherein said manufacturing process code includes dynamic link library functions.

6. The computer system of claim 5, wherein the dynamic link library functions can be called by an external software application installer, the external software application installer including an installation routine used in the manufacture of a custom built-to-order computer system.

7. The computer system of claim 5, wherein the dynamic link library functions include a GetCdRomDriveLetter function and a GetFakeCdRomDriveLetter function.

8. The computer system of claim 7, wherein the GetCdRomDriveLetter function makes use of a combination of a GetExpectedDriveTypeList function and a GetDriveType function.

9. The computer system of claim 8, wherein further the GetCdRomDriveLetter function is a DLL exported function and returns to a calling routine one of the following selected from the group consisting of i) a drive letter designation of the computer-readable media drive or ii) a zero if the computer-readable media drive was not found or expected.

10. The computer system of claim 8, wherein further the GetFakeCdRomDriveLetter function is a DLL exported function and returns to a calling routine one of the following selected from the group consisting of i) a drive letter designation of the computer-readable media drive if one has already been assigned and ii) a drive letter designation which is assigned to the computer-readable media drive if the computer-readable media drive letter has not been previously assigned.

11. The computer system of claim 8, wherein the GetExpectedDriveTypeList function is a DLL internal function and provides for the building of an internal drive type table.

12. The computer system of claim 8, wherein the GetDriveType function is a DLL exported function and returns to a calling routine a drive type associated with a root directory passed by the calling routine.

13. A computer system method comprising:

providing at least one processor;

providing at least one computer-readable media drive;

providing manufacturing process code including executable instructions for causing the at least one processor to determine a drive letter designation of the at least one computer-readable media drive;

providing an operating system, the operating system including a desktop suitable for implementation of shortcuts and menu selections to computer-readable media drive based software applications; and providing a system descriptor record, wherein the drive letter designation of the computer-readable media drive is a function of the operating system and the system descriptor record.

14. The method of claim 13, wherein the manufacturing process code further enables a determination of the computer-readable media drive letter designation by the at least one processor to be operable prior to the operating system desktop becoming fully initialized, further for enabling a binding of computer-readable media drive based software applications in an establishing of the shortcuts and menu selections on the desktop.

15. The method of claim 13, wherein the computer-readable media drive includes a CD-ROM drive.

16. The method of claim 13, wherein the computer-readable media drive includes a removable cartridge hard disk drive.

17. The method of claim 13, wherein the manufacturing process code includes dynamic link library functions.

18. The method of claim 17, wherein the dynamic link library functions can be called by an external software application installer, the external software application installer including an installation routine used in the manufacture of a custom built-to-order computer system.

19. The method of claim 17, wherein the dynamic link library functions include a GetCdRomDriveLetter function and a GetFakeCdRomDriveLetter function.

20. The method of claim 19, wherein the GetCdRomDriveLetter function makes use of a combination of a GetExpectedDriveTypeList function and a GetDriveType function.

21. The method of claim 20, wherein further the GetCdRomDriveLetter function is a DLL exported function and returns to a calling routine one of the following selected from the group consisting of i) a drive letter designation of the computer-readable media drive or ii) a zero if the computer-readable media drive was not found or expected.

22. The method of claim 20, wherein further the GetFakeCdRomDriveLetter function is a DLL exported function and returns to a calling routine one of the following selected from the group consisting of i) a drive letter designation of the computer-readable media drive if one has already been assigned and ii) a drive letter designation which is assigned to the computer-readable media drive if the computer-readable media drive letter has not been previously assigned.

23. The method of claim 20, wherein the GetExpectedDriveTypeList function is a DLL internal function and provides for the building of an internal drive type table.

24. The method of claim 20, wherein the GetDriveType function is a DLL exported function and returns to a calling routine a drive type associated with a root directory passed by the calling routine.

* * * * *